Aug. 23, 1955   W. R. SEIPT   2,716,070
LIME-SILICA INSULATION AND METHOD OF MAKING
Filed July 11, 1949   8 Sheets-Sheet 1

INVENTOR
WILLARD R. SEIPT
BY HIS ATTORNEYS
Howson & Howson

Aug. 23, 1955  W. R. SEIPT  2,716,070
LIME-SILICA INSULATION AND METHOD OF MAKING
Filed July 11, 1949  8 Sheets-Sheet 3

INVENTOR
WILLARD R. SEIPT
BY HIS ATTORNEYS
Howson & Howson

Aug. 23, 1955　　　　W. R. SEIPT　　　　2,716,070
LIME-SILICA INSULATION AND METHOD OF MAKING
Filed July 11, 1949　　　　　　　　　　　　8 Sheets-Sheet 4

INVENTOR
WILLARD R. SEIPT
BY HIS ATTORNEYS
Howson & Howson

Aug. 23, 1955  W. R. SEIPT  2,716,070
LIME-SILICA INSULATION AND METHOD OF MAKING
Filed July 11, 1949  8 Sheets-Sheet 5

INVENTOR
WILLARD R. SEIPT
BY HIS ATTORNEYS
Howson & Howson

Aug. 23, 1955  W. R. SEIPT  2,716,070
LIME-SILICA INSULATION AND METHOD OF MAKING
Filed July 11, 1949  8 Sheets-Sheet 6

P = PERCENT BLOCKS BROKEN OR BADLY CRACKED IN SHIPPING TESTS.

I = IMPACT, FT.- LBS.

INVENTOR
WILLARD R. SEIPT
BY HIS ATTORNEYS
Howson & Howson

Aug. 23, 1955 W. R. SEIPT 2,716,070
LIME-SILICA INSULATION AND METHOD OF MAKING
Filed July 11, 1949 8 Sheets-Sheet 7

INVENTOR
WILLARD R. SEIPT
BY HIS ATTORNEYS
Howson & Howson

Aug. 23, 1955 W. R. SEIPT 2,716,070
LIME-SILICA INSULATION AND METHOD OF MAKING
Filed July 11, 1949 8 Sheets-Sheet 8

INVENTOR
WILLARD R. SEIPT
BY HIS ATTORNEYS
Howson & Howson

United States Patent Office 2,716,070
Patented Aug. 23, 1955

2,716,070
LIME-SILICA INSULATION AND METHOD OF MAKING

Willard R. Seipt, North Wales, Pa., assignor to Keasbey and Mattison Company, Ambler, Pa., a corporation of Pennsylvania Application July 11, 1949, Serial No. 104,128

2 Claims. (Cl. 106—120)

This invention relates to an improved thermal insulation material and to the method of manufacturing such material.

One object of the invention is to provide a light weight, efficient, high temperature insulation material of generally improved characteristics.

Another object is to provide a highly practical method of manufacturing such material.

Still another and more specific object is to provide an insulation material of the preformed type exhibiting a lesser tendency to crack from thermal warpage, and a materially higher temperature limit than the prior materials of the same type.

A further object is to provide an insulation material of the stated type which shall be less brittle than the prior materials of like type, and which, therefor, shall possess better handling characteristics.

A still further object is to provide a relatively economical insulation material of the stated type.

More particularly, the invention contemplates an insulation material of the stated type which, as compared with prior products of the same class, shall exhibit a relatively low desired density, a relatively high strength at the preferred density, a materially higher temperature limit, and above all, the ability of this low density product to be satisfactorily shipped and applied economically and without excess breakage.

Insulation materials hitherto available in commerce have exhibited unfavorable limitations in one or more important characteristics, such for example as low crushing strength, brittleness as exhibited by low resistance to mechanical shock, rapid loss of efficiency at elevated temperatures, inability to withstand high temperatures, deterioration under high humidity conditions, high trimming losses in the manufacturing process, and relatively high densities. As a result no one of these insulations is suited for all purposes, and they have been lacking in universal applicability. It is a primary object of the present invention to provide an insulation material of relatively light weight, high efficiency, high physical strength, and ability to withstand and to maintain efficiency under high temperature conditions, which may be made by a highly practical and economical process, and which, by reason of these multiple favorable characteristics, is substantially universally applicable for thermal insulation purposes.

We have found that calcium silicate constitutes a highly favorable medium for production of insulation materials of the desired characteristics. With this material, and utilizing the basic setting reaction between lime and silica to form a hydrated calcium silicate, it is possible by practice of the present invention, to produce a molded insulation material of low material cost and involving extremely small trimming losses, wherein the density is controllable over a wide range of values extending as low as seven pounds per cubic foot. This finished product is white in color, has high strength in relation to its density, is not brittle, and has a temperature limit of about 1500 degrees Fahrenheit. In this combination of properties, the material represents a substantial improvement over the prior commercial insulation materials.

Figure 1:
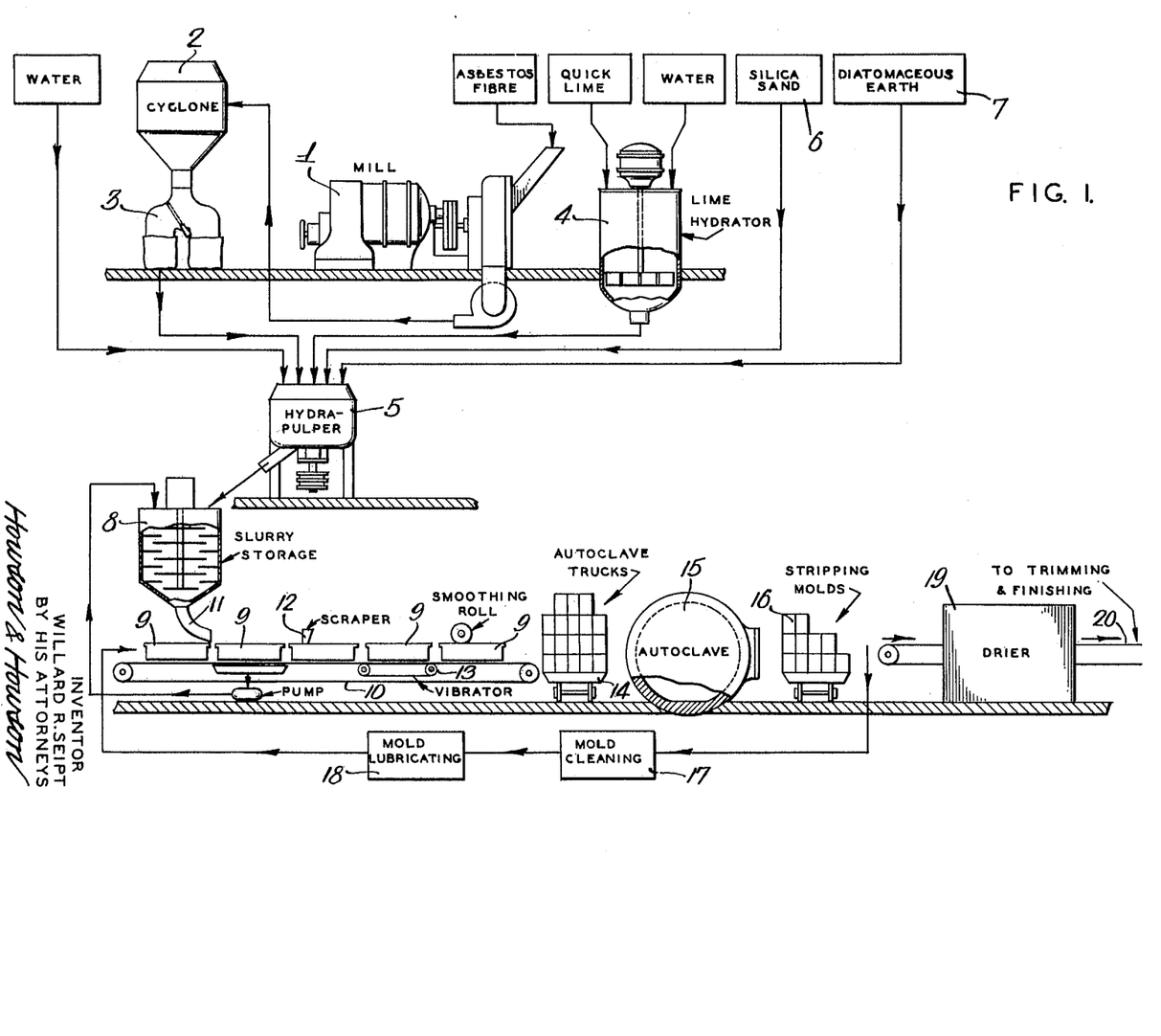
Fig. 1 shows a flow sheet illustrating diagrammatically a method and apparatus for producing insulation materials in accordance with the invention.

A process of manufacture of the aforesaid insulation material is illustrated diagrammatically in Fig. 1 of the attached drawings. As therein illustrated, asbestos fibre is opened in the dry state in a mill 1, and is then blown into a cyclone 2 and dropped into a collector 3.

Pebble lime (quick-lime) is hydrated with water in a hydrator 4. The hydration is carried out with high speed agitation. The water may be either hot or cold when added to the hydrating tank. In any event, it is desirable to have the hydrated lime slurry relatively cool before it is run into a Hydrapulper 5.

To the Hydrapulper 5 is also passed the prepared fibre from the collector 3, pulverized silica sand 6, diatomaceous earth 7, and a quantity of water depending on the desired density of the product. It may be desirable also to add a small quantity of pulverized trimmings from the previous runs. After thorough mixing, the mass is transferred from the Hydrapulper to a storage tank 8. Molds 9, placed on conveyor 10, are filled from the storage tank 8 through a specially adapted filling nozzle 11, the mass preferably being leveled in the molds by any suitable means such as a scraper 12. Entrapped air is removed by shaking the molds through the medium of a suitable vibrator 13 and the molds are then placed on an autoclave car 14 and carried into an autoclave 15, where they remain under approximately 125 pounds per square inch of steam pressure for the desired length of time, say for example, 12 hours. The molds are then removed from the autoclave and are inverted so as to strip them from the set product 16. The molds are then cleaned at 17, lubricated at 18, and returned for reuse to the conveyor 10. The stripped pieces 16 are placed in a dryer 19 and when sufficiently dry are removed, trimmed and finished for shipment at 20.

In the process described above, the properly prepared asbestos fibres serve as a suspending and dispersing agent for the necessary binding materials during setting, and as a reenforcing agent in the set structure. The opened fibres act also to afford a product characterized by low density and a microporous structure, relatively high strength free from brittleness, good insulating value and a high temperature limit.

It is important in the preparation of the asbestos fibres as an ingredient of the thermal insulation material that the process employed shall break down the fibre bundles to a sufficient degree to yield a high bulk value in the freshly prepared slurry without excessive reduction of the original fibre lengths. I have found that a dry processing, described above in general terms and more specifically hereinafter, is highly effective to this end. Another important phase of the invention, contributing to the production of the light weight thermal insulation material, resides in the step of mixing the slurry of freshly prepared quick-lime with a finely particulate silica and the highly bulked asbestos fibre, and forming this mixture in a mold to the desired shape, and the subsequent subjection of the formed mass to steam under pressure of 100 to 160 pounds for a sufficient time to cause essentially all of the lime to react with the silica to form a stable calcium silicate hydrate, the set product being eventually removed from the molds and dried.

It is important in the production of a light weight thermal insulation of the hereindescribed character, having relatively high strength in relation to its light weight and a high temperature limit, that the ingredients be proportioned so that the slurry after mixing will be mechanically stable when placed in the molds and that substantially no settling shall occur either before or during autoclaving. It is important also that the hydrated lime slurry be in a highly reactive form and shall be in the presence of sufficient silica for a sufficient length of time that essentially no unreacted or "free" lime shall remain. Too much unreacted lime tends to cause an unstable product. If for economic reasons, complete reaction of the silica is not desirable, (very fine grinding of the silica and long autoclaving times are both expensive) then a sufficient excess of silica should be added so that at least an equi-molecular ratio shall react with the lime. In such case, the interior portions of the coarser particles will not be reacted, and the unreacted silica will increase the density of the product without corresponding increase in strength. This may be tolerated within certain limits.

Mention was made above of a possible reuse of a portion of the dried calcium silicate recovered from trimmings. If thus used the calcium silicate may be pulverized in the dry state and mixed with the slurry of raw materials to function as an aid in maintaining a stable suspension.

It is to be noted further that a higher temperature limit for the product may be secured by limiting the "free" alumina content that is available to react with the lime in the setting conditions, as hereinafter more fully set forth.

With respect to the fibre component of the thermal insulation material, it is to be noted that lime and silica require additional agents to hold them in suspension in order to produce a light weight product, that is, one with a high void content. Such suspending agents must have a high bulk value in themselves and must be compatible with lime and silica. As set forth above, one function of the fibres in the insulation is to disperse and maintain in suspension the very fine component materials until the mass has attained rigidity, to the end that the void space necessary in a light weight insulation and homogeneity of the product be maintained. The second function of the fibres is to act as a reenforcing agent in the finished product. The greater the number of individual, free fibres and the greater the length to diameter ratio, the more effective will be their dispersion and suspension powers. However, the maximum reenforcing power as well as a preferred fibre orientation is obtained from a length to diameter ratio that does not exceed a certain value. For these reasons an optimum fibre preparation is highly desirable.

The present process, described in greater detail below, is calculated, therefore, to retain to as great an extent as possible the original length of the fibres. The process is calculated also to defiberize the asbestos to as great a degree as possible, so as to increase the number of individual fibres in the slurry and yet not to exceed a critical length to diameter ratio. It is contemplated also to maintain final densities to values below 20 pounds per cubic foot and to as low as 7 pounds per cubic foot without settling, dewatering or compressing, as hereinafter fully set forth.

The process of the present invention will produce an insulation having a uniform size of micro-pores and substantially even distribution of said pores throughout the mass. Also, the degree of porosity or the total volume of voids may be closely controlled. A bond is obtained between the particles so that practically no shrinkage will occur on drying. The direction that the fibres assume is a function of the manner of filling the molds and to some degree depends upon the type and preparation of the fibre. A particular fibre orientation is essential to obtain a more flexible product that will withstand greater mechanical shock and greater warpage strains due to exposure to higher temperatures. The desired fibre alignment may be approached to a satisfactory degree by a method of filling, as hereinafter fully set forth. The temperature limit of the product of this invention is controlled by the material itself, the fibres and the fibre orientation, and temperatures of at least 1500 degrees are possible without material disintegration, excessive shrinkage or warpage, excessive softening of the material or, extensive cracking.

It is not understood with exactitude by what process the particular fibre preparation increases the suspending power of the fibre, but it is possible that a combination of phenomena is responsible. The increase in number of fibres per unit weight of the original crude fibre, together with the fact that a considerable degree of original fibre length has been retained, undoubtedly acts to produce a meshed, fibrous network of considerably increased void space and consequently increased bulk. Furthermore, any surface contains some degree of free electrical charge so that an increase in surface area will result necessarily in an increased surface charge per unit weight. Since the fibres are reduced in diameter, the surface charges per unit weight will have increased considerably and to some extent will have approached a colloidal condition, or possibly colloidal in diameter but not in length. The fibres tend to floc and it is believed that due to the repelling charges each floc forms a bridge over the gap between two other adjacent flocs. This would leave a pore space between the flocs. Also, each individual fibril in a floc is held apart somewhat from its neighbors so that the flocs themselves are porous. The manner in which the surface charge and the mechanical nature of the fibres act together, or what other forces contribute to the suspending power of the fibre, is not definitely known. Whatever action is responsible, the explanation given is not intended to limit the scope of the invention.

The amount of fibre may be varied so that the finished product contains from 8 to 40 per cent fibre on the basis of the total dry solids. It has been found that below 8 per cent fibre the suspending power is insufficient to hold the solids without appreciable settling. Also, the reinforcing value will be reduced so that the product does not have as great a resistance to shearing and is unduly brittle. Above 40 per cent fibre the strength of the product is again reduced. The fine solids added to the fibre act as fillers between the spaces left by the fibres, thereby reducing the pore size considerably, and they also act as a binder to hold the particles and the fibres in rigid interrelationship. Reduction in the amount of fine solids by increasing the fibre content will necessarily lower the bond between the fibre. Eventually the reenforcing effect of the increased fibre content is offset by the loss of bond between the fibre resulting in lower strength.

With respect more particularly to the character of the fibre component of the insulation material, I have found that the harsh asbestos fibres are preferable in that fibres of this type appear to afford better suspension and contribute more substantially to the reinforcing function. Marsh fibres are defined as those fibres that have a greater degree of resiliency than the soft fibres; upon removal of a deflecting force the harsh fibres more or less spring back to their original linear state whereas a soft fibre will remain in a bent position upon removal of the deflecting force. Harsh fibres are not typical of any class of mineralogical species; there may be harsh or soft chrysotile fibres as well as harsh or soft amphiboles. While substantially any harsh fibre may be used, certain grades, such for example as amosite M–1, appear to give somewhat less settling, less brittleness and the ability to withstand thermal strains to higher, hot surface temperature exposures. Other fibres such as the longer grades of the C & G fibres, a harsh African chrysotile, may be used satisfactorily. For minimum density and maximum strength the fibres should be cleaned of dirt, fine stone and other foreign matter.

Figure 2:
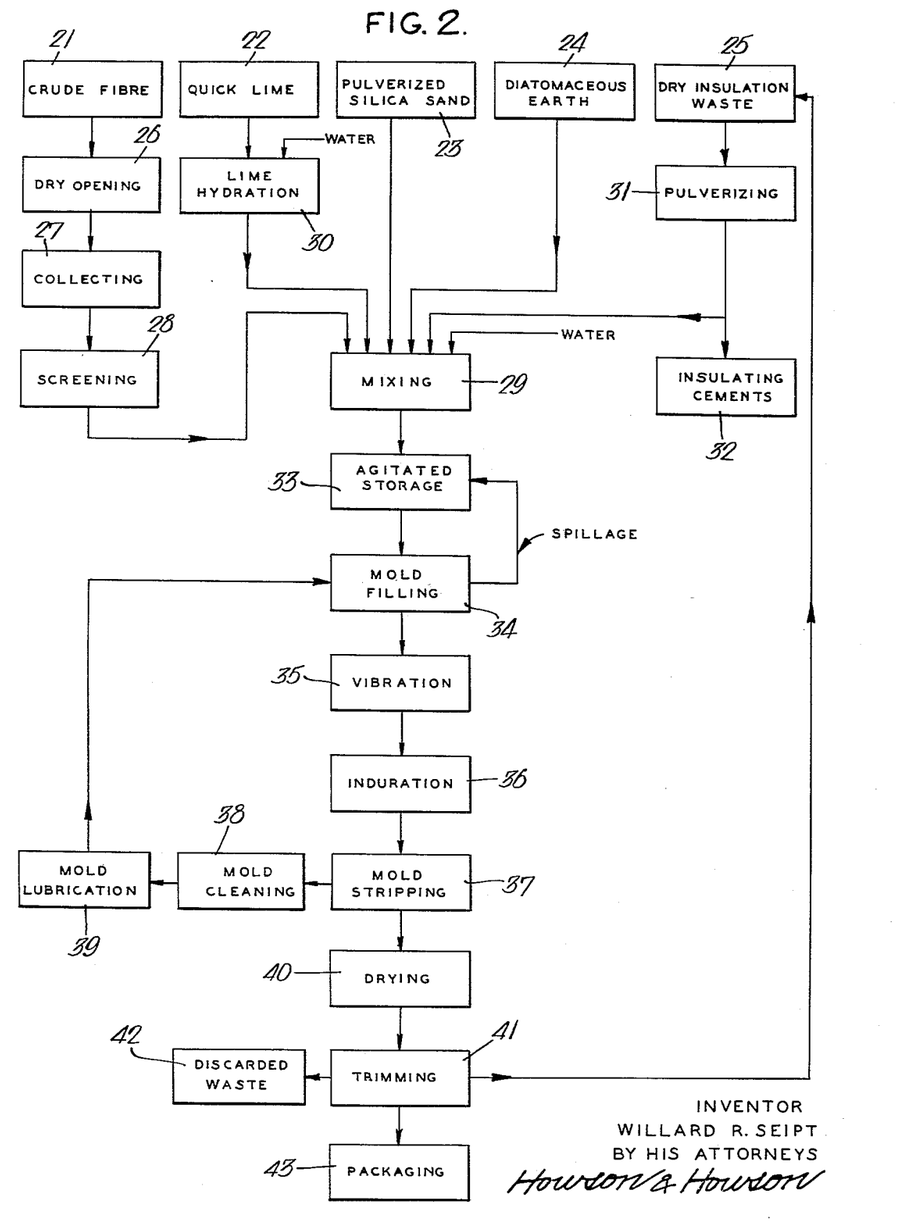
Fig. 2 shows a flow sheet illustrating diagrammatically a procedure for making calcium silicate insulation in accordance with the invention.
Figure 3:
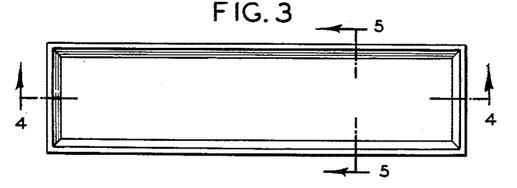
Fig. 3 is a top plan view of a type of mold that may be employed in the production of one form of the insulation materials.

Fig. 2 illustrates in detail a method of manufacturing calcium silicate insulation in accordance with the invention. The raw materials, as indicated, consist of crude fibre 21, quick-lime 22, pulverized silica sand 23, diatomaceous earth 24, and dry insulation waste 25.

The flow sheet illustrated in Fig. 2 of the drawings is in part a diagrammatic representation of a suitable fibre preparation process. This is presented as an example and is not to be considered as restricting the invention. Also, the process is subject to modification in detail. The screening, for example, may or may not be done, or the fibres may be screened by some other method at another point in the process. An additional preparation of the fibres such as attrition of the fibres in a slurry form in any of the several attrition type mills may also be included in the preparation process. An example of a commercial mill that will produce satisfactory results is the Hydrapulper.

In the procedure illustrated in Fig. 2, the crude fibre is first subjected to a dry opening operation at 26. Any method of preparation is suitable as long as the crude fibres are fiberized to the optimum extent so that a critical length to diameter ratio is not exceeded and so that excessive breakdown of the original fibre length does not occur. One method of accomplishing the desired result is by the use of a rotary fiberizing mill of special design. The rotor consists of a concentric ring of attached steel fingers moving in a casing of stationary fingers. The casing comprises one ring having a diameter smaller than that of the rotating ring of fingers and another having a diameter larger than that of the rotating ring. The fibre is forced through the stationary fingers by an air stream and is opened or shredded when it is struck by the rotating fingers in its passage through the two stationary rings.

As the fibres come from the opening operation they pass to collectors 27. These collectors may be of the usual cyclone type familiar to the industry. From the collectors the fibres pass to screens 28 where dirt and foreign materials are removed. The cleaned fibres are then ready to be added to the mixing operation 29.

The quick-lime is hydrated with water in the hydrator tank 30. Any tank provided with suitable agitation may be used. Examples of agitation mediums are paddles, propellers or blades. The tank and the agitator should be designed so that the quick-lime is kept in suspension and is rapidly mixed with the water during the hydration. The purpose is to accomplish the hydration as quickly as possible to produce a highly colloidal hydrated lime.

The dry insulation waste 25 represents trimmings and rejected material from the finishing operation 41. This is pulverized in a pulverizer 31. Any type of equipment that will break up the waste so as not to pass any lumpy material will be satisfactory. A hammermill is the preferred pulverizer. The pulverized waste may be used to a limited extent with the raw materials, as described. It may also be bagged and sold as a light weight, high temperature insulating cement 32.

The raw materials and necessary water are run into mixer 29. Any satisfactory type of commercial mixing equipment will be suitable. The important function of the mixer is to obtain a thorough and intimate dispersion of the individual particles of the raw materials. It is important that the raw materials are thoroughly dispersed, otherwise the suspension may settle and the finished product will not attain its greatest possible physical properties as a result of the non-homogeneous structure. The result of a mix not sufficiently dispersed would tend to produce a weaker, more brittle, less efficient insulation with a lowered temperature limit. Examples of mixers that can be used are high speed turbo-mixers and attrition mills that can handle liquid slurries. The Hydrapulper type mixer is a commercial attrition mill having the desired action. It is important that during the mixing operation the fibres are not shortened to any appreciable extent. After the slurry is thoroughly mixed and dispersed it is transferred to the storage tank 33.

Figure 4:
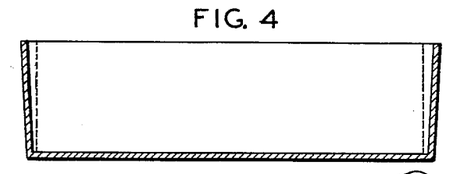
Figs. 4, and 5 are, respectively, sectional views on the lines 4—4 and 5—5, Fig. 3.
Figure 5:
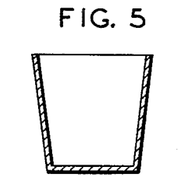

In accordance with this invention the suspended slurry is formed to shape and then allowed to set rigidly. Shaping the mass requires the use of molds, the design of which may be such that the fluid mass can be held to form until it has attained rigidity. After the material has set, it may be removed from the mold. One form of mold for blocks is a solid container of the desired dimensions with the top face open and the sides and ends tapered to facilitate removal. Such a mold is illustrated more or less diagrammatically in Figs. 3, 4, 5, 6 and 6a of the drawings. Since the mass has little if any shrinkage upon setting or drying, it is difficult to remove the wet block, even with tapered sides and ends. This is due in part to the retention of the piece in the mold by atmosphere pressure, since air cannot get between the mold and and the block, but the major factor in a tapered mold is due to the thermal shrinkage of the metal mold upon cooling, which grips the encased block tightly. This condition may be remedied by inserting wedges, shown in Fig. 6 and by the broken lines in Fig. 4, in the ends with an equal but reverse taper. This not only forms a block having its ends perpendicular to the bottom of the block, but when the wedges are removed from the mold, air can enter between the block and the bottom of the mold, and the block then can very easily be separated from the mold by supporting the inverted mold and tapping it lightly. To prevent the blocks from sticking to the mold faces and particularly the bottom of the mold where the slurry had struck during the filling operation, parting compounds are used. These compounds also assist in easing the block out of the inverted mold by a lubricating action. Examples of parting compounds are petroleum oils, greases, waxes and combinations such as paraffin wax mixed with powdered mica.

Figures 6, 6A, 7, 8:
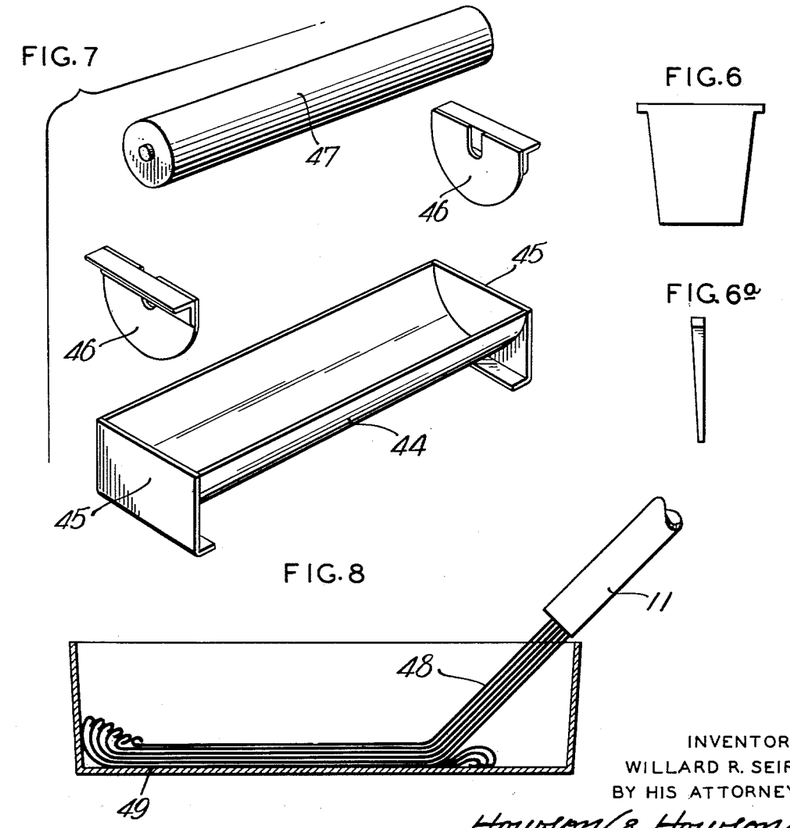
Figs. 6 and 6a are front and side views, respectively, of a type of wedge inserted at the ends of the type of mold shown in Fig. 3.
Fig. 7 is an exploded view in perspective of another form of mold.
Fig. 8 is a diagrammatic representation of a preferred method of filling a mold.

Hollow elongated articles as used for pipe covering are conventionally split lengthwise to permit application to existing pipe installations. These half sections may readily be formed with a mold having a semi-cylindrical design. A length, usually slightly over 36 inches, of a smooth metal tube cut in half lengthwise or a sheet metal rolled to the proper diameter, having an inside diameter equal to the desired outside diameter of the molded material, would be suitable. Flat sheets of metal may be welded on the ends to act as retainers for the slurry and as a support to hold the mold solidly. Spacer strips of semi-circular construction are inserted at the ends of the mold. These strips are slotted to support the core concentrically within the shell of the mold, and serve also to assist in removing the mold from the set piece by eliminating binding of the mold on the piece due to thermal shrinkage. The core may also be made of a smooth metal tube or a rolled section of sheet metal with an outside diameter equal to the desired inside diameter of the molded material. Such a mold is illustrated in Fig. 7 wherein the outer mold or shell is indicated by reference numeral 44, the end retainers by numeral 45, the spacer strips by numeral 46 and the core by the numeral 47.

Figure 9:
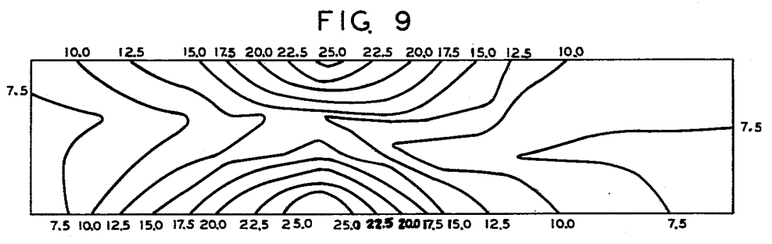
Figs. 9 to 24, inclusive, are diagrams showing graphically certain of the characteristics of insulation materials made in accordance with the invention.
Figure 10:
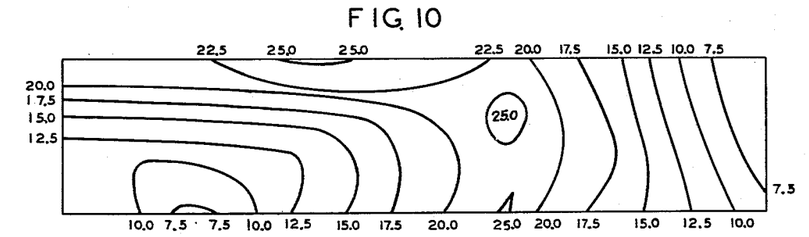

The molds are filled with slurry by any suitable filling device, indicated at 34, the slurry being fed from the storage tank 33. Two functions are served in the filling operation. First, the device will just fill the molds, preferably level full. Second, the slurry should be run in the molds in such a way that a preferred orientation of the fibre is accomplished. As explained previously the maximum reenforcing power is obtained when the fibre length to diameter ratio approaches but does not exceed a certain critical value. However, the maximum reenforcement of the fibres cannot be realized unless the fibres are oriented in a preferred direction. A standard commercial size for block insulation is 36 inches long, 6 inches wide and from 1 to 4 inches thick. The greatest stresses will occur over the longest dimension and will cause the block to rupture through a cross section perpendicular to the length. Hence the greatest reenforcement is needed to prevent this rupture. The fibre lengths should, then, be perpendicular to the above mentioned cross section or parallel to the length of the block. The preferred orientation may be obtained by one of several ways, such as alignment by the passage of a mechanical comb through the slurry in a direction parallel to the length of the filled mold. However, I have found that the molds can be filled in such a manner that the majority of the fibres are aligned parallel to the length of the mold. When a fibrous mass or slurry flows under force, the fibres will tend to be aligned in a direction that will reduce the apparent viscosity of the mass to a minimum value; that is, the friction or drag between the layers of the moving mass will be minimized by the fibre alignment. In flowing through a pipe the fibres will be aligned so that the fibre lengths will be parallel to the direction of flow. If the slurry is run into a mold from a spout or pipe nozzle in a direction perpendicular to the bottom of the mold, the mass will roll out toward the ends of the mold under the previously deposited layer of material. This action aligns the fibres concentrically around the point of entry. Hence the majority of fibres will be parallel to the width of the mold. This alignment is undesirable. A much better fibre alignment can be attained by a filling method as shown in Fig. 8 of the drawings. The slurry 48 is allowed to strike the bottom of the mold 49 at an angle and near one end. The force of the slurry tends to prevent a rolling action and to retain the fibre direction parallel to the stream movement which is parallel to the length of the mold. Hence the fibres will be oriented in the preferred direction. The drawing of course illustrates only one means of retaining the preferred fibre orientation established in the flow stream. As indicating the results of the aforedescribed fibre reenforcement, the following example may be cited:

Molded blocks about 36 x 6 x 6 inches were sawed to 4 smaller blocks 36 x 6 x 1½ inches in such a manner that the saw cut was vertical with respect to the blocks, position when in the mold. Each smaller block was then cut to 6 x 6 x 1½ inch pieces which were subjected to an impact test such that the plane of the broken cross section was perpendicular to the 36 inch length of the original block. The impact tester is of the pendulum type, with a hammer having a striking face 6 x 1½ inches, a striking velocity of 8.3 feet per second and a capacity to deliver 28 foot pounds of work. The 6 x 6 x 1½ inch test specimen is clamped vertically in a vise with a free end 3 x 6 x 1½ inches, above the vise. The hammer strikes the piece with a clearance of ⅛ inch above the top of the vise, and the energy absorbed in fracturing the piece is determined. With average impacts of the pieces from a number of 36 x 6 x 6 inch blocks, a contour diagram was constructed to show the variation of impact in a plane through the center and parallel to top and bottom surface of a 36 x 6 x 6 inch block. Fig. 9 of the drawings is such a diagram illustrating the variation in reenforcing power of the fibre when the mold was filled from a nozzle in a direction perpendicular to the bottom of the mold. It will be noted that the impact value is high along both sides near the middle of the mold but drops off rapidly in all directions so that the average impact value over the entire block is 11.8 foot-pounds. Fig. 10 of the drawing clearly illustrates the advantage in filling by the preferred direction illustrated in Fig. 8. The highest impact is near the very center of the mold and drops off rather slowly in all directions so that the average impact value over the entire block is 16.1 foot-pounds.

After the molds are filled a smoothing roll or scraper may be employed, if desired, to produce a level surface within the molds.

During the mixing and mold filling operations, air pockets are unavoidably trapped in the mix. It is desirable to remove this air since it will leave holes in the finished product. These holes reduce the insulating value and the strength of the units and, where they show, they detract from the appearance of the product. The air can be removed after filling the mold, by means of a vibrator 35, Fig. 2. The ease of removal of air depends upon the viscosity or the apparent viscosity of the liquid slurry. I have emphasized the desirability of a thin suspension both for ease of pouring and for removal of undesirable air pockets. The mass may be vibrated by use of an internal vibrator, such as is used in placing concrete, or the entire mold may be vibrated by any suitable mechanical means.

The mass is then caused to set in the autoclave 36. This takes place most favorably between 100 and 160 pounds per square inch pressure of saturated steam. The time of setting depends on the reactivities of the lime and the silica, the ratio of silica to lime in the mix, and the degree of completion of the desired reaction. These factors as well as the time of autoclaving, are limited by economic considerations so that the range of autoclaving time will ordinarily vary between 2 and 20 hours.

The total time in the autoclave will exceed the actual autoclave reaction time at full pressure by 3 or 4 hours. This time is consumed in building up and releasing the pressure. It is preferable to build up the pressure rapidly, and at no time before the mass has set should the temperature within the mass exceed the boiling point of water under the particular pressure at that time. Somewhere around one-half or one hour will elapse from the time the pressure is first applied before the whole mass has reached a sufficient temperature and any appreciable setting has occurred throughout the mass. Decreasing the pressure in the autoclave must be done slowly. The rate depends upon the exposed area of the product in relation to its volume and the volume of water in the product. As the pressure is released, the temperature of the water in the set mass begins to exceed the boiling point of water corresponding to the particular pressure at that instant and as a result it boils until the excess heat has been consumed. This process, continued until all the pressure has been released, will remove about 20 to 40 per cent of the water. This is a considerable amount of water to move through the microscopic pores to the exposed surface of the piece in a short time. If the autoclave pressure is released too suddenly the pressure that builds up within the piece in excess of the autoclave pressure external to the piece may literally blow it apart. The decrease in pressure to atmospheric condition, will ordinarily take from 2 to 4 hours.

The molds are now removed from the autoclave and the set pieces removed by the mold stripper 37. This may be a mechanical device to remove the wedges, invert the molds and tap them lightly so as to dislodge the pieces and allow them to drop free from the mold. The molds are then cleaned at 38. This may be done by a rotating wire brush, or by blasting the mold with a high velocity water jet or with small pellets in an air stream to dislodge any particles of the insulation that are still sticking fast.

As previously described, parting compounds may be used to eliminate the tendency of sticking to the molds and lubricate the piece in sliding out of the molds. The cleaned molds can be coated in the applicator 39. This may be an oil bath in which the molds are dipped, the excess oil being allowed to drain off. Another means of applying the parting compounds is by spraying or brushing. This may be used for oils, greases or waxes. The greases or waxes can be applied in a liquid state either by heat or solvent. The cleaned and coated molds are now ready for return to the mold filling device 34.

The pieces of set insulation taken from the molds are placed in the drier 40. Many driers of suitable type are available in the industry. The essentially dry pieces are then trimmed at 41 to remove all unevenness.

It is more economical to mold several blocks as a unit and split these to the smaller size blocks. This requires fewer molds since several smaller blocks and blocks of various thickness can be obtained from one large size mold. The splitting operation can be done simultaneously with the trimming process. Any suitable equipment familiar to the industry can be used for trimming and splitting. Examples of such equipment are band saws, circular saws and milling cutters. The waste and trimmings may be discarded as at 42 or pulverized as at 31 and a portion returned to the system for reuse as described above. The trimmed pieces are ready for packaging 43 and shipment.

The process described above is merely illustrative and not intended to limit the scope of the invention, since variations in the process are possible without departing from the spirit of the invention. For example, the pulverized insulation waste may if desired be left out of the composition; the order of mixing the raw materials may be altered; all silica sand or all diatomaceous earth may be used instead of the combination; dry hydrated lime may be substituted for the freshly hydrated quick lime; variation in the fibre type and fibre preparation may be utilized; and trimming may be done before drying instead of after drying.

While it is considered that the reaction between calcium hydroxide and silica affords the best results in production of thermal insulation of the character described, it is to be noted that other alkaline earth compounds may be employed and also other suitable siliceous and aluminous materials. The alkaline earth compounds may be any suitable substance capable of liberating alkaline earth hydroxides with water and thereby capable of reacting with the siliceous or aluminous materials to form a cementing bond. Magnesium hydroxide, for example, when reacted with a highly reactive silica in the form of a natural diatomaceous earth in a procedure and in relative proportions corresponding substantially with those herein described, afforded a magnesium silicate product of adequate but substantially lower modulus of rupture-to-density ratio than that of the corresponding calcium silicate product. The products afforded under like conditions by the hydroxides of barium and strontium exhibited still lower ratios of modulus of rupture-to-density, showing decided advantages in the use of calcium. Examples of calcareous materials that may be used as a raw material in the practice of this invention are quick lime, wet or dry slaked lime, Portland cement or the like. It is preferable that the alkaline earth materials be in a very fine state of subdivision before the reaction is caused to occur.

The siliceous raw materials may be any substance containing silica that is capable of reacting with alkaline earth hydroxides to form a bond. Examples of such materials are silica sands, silica gels, diatomaceous earth, pozzuolana or the like. Diatomaceous earth is of particular value in that through its use the thermal conductivity may be somewhat reduced as compared to that when pulverized silica sand is used.

The aluminous raw materials may be any substance containing alumina that is capable of reacting with alkaline earth hydroxides to form a cement bond. Examples of such materials are bauxite, any hydrated aluminum oxide extract of bauxite, clays or the like.

The reaction between the alkaline earth hydroxide and the siliceous or aluminous materials require the presence of water. The exact mechanism of the reaction to form a set condition is not understood. The theory is that the reaction between lime and silicia occurs by the precipitation of a hydrated calcium silicate. Evidence seems to indicate that a pentita-hydrate of a mono (meta-) calcium silicate is formed. The water is needed then to form the solutions necessary for the reaction, in addition to composing a part of the reaction product. Water is also required to maintain the desired void space. The weight of water may vary between 3 to 10 times the weight of the dry, raw materials depending upon the density desired in the finished product. The finely divided solids must be held in suspension and in a dispersed condition. This is accomplished by the use of the prepared asbestos fibres, as set forth above.

The reaction stated above will take place to a limited etxent at room temperature. For practical reasons the speed of the reaction is increased considerably by subjecting the mixture to higher temperatures in the presence of water. In order to attain the conditions of temperature and moisture, saturated steam under pressure is required. This autoclaving process also effects a more complete reaction between the alkaline earth hydroxide and the siliceous or aluminous materials. It has been found that the gerater the conversion of all the raw materials to the cementing bond, the better will be the strength and stabiliy of the final product. In order to get the highest degree of transformation a balance must be held among the separate variables. These variables include autoclaving time, autoclaving temperature, degree of fineness of the reacting materials and the ratio of the silica or alumina to alkaline earth hydroxides.

The ratio of the mols of silica present in the siliceous materials to the mols of lime present in the calcareous materials, may vary between 1 and 3, depending upon the desired properties of the product, the reactivity of the raw materials, and the time and temperature allowed to autoclave the mix.

The effect of some of the variables are shown graphically in the curves of Fig. 11 to Fig. 22, inclusive.

Figure 11:
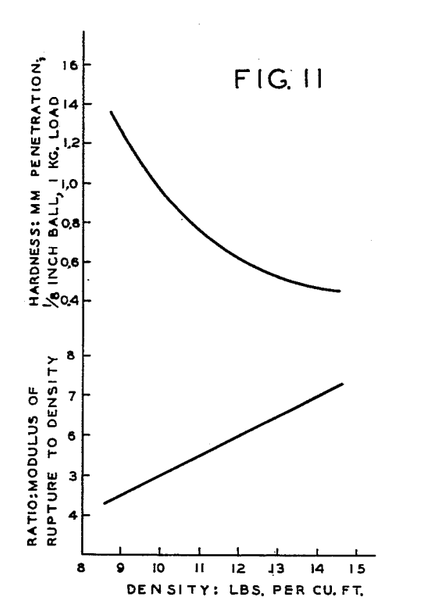
Figure 12:
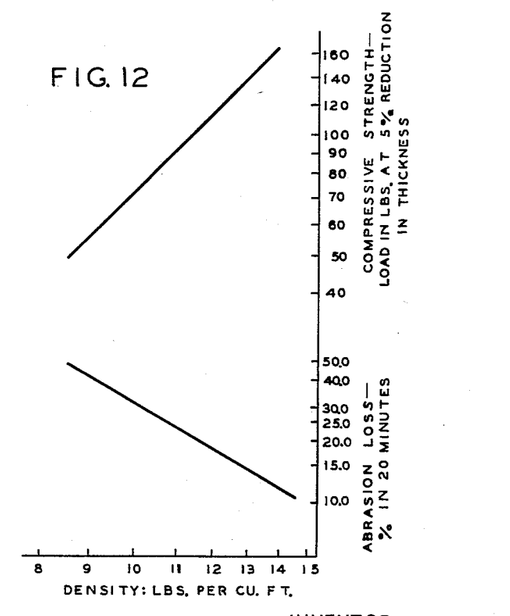

Figs. 11 and 12 show the variation in physical properties of a particular composition when the amount of mixing water is altered. This change in mixing water, of course, affects the density which is the value plotted. These curves are typical of the materials and although they were made from one particular set of conditions, nevertheless they show the general tendency of the material under other conditions. They show what rate of increase may be expected for the hardness, transverse strength, compressive strength and abrasion resistance by an increase in density.

Figure 13:
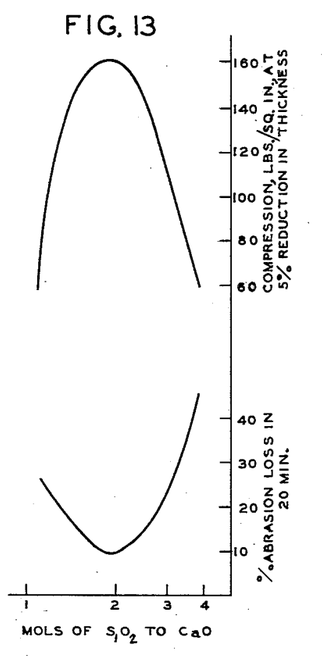
Figure 14:
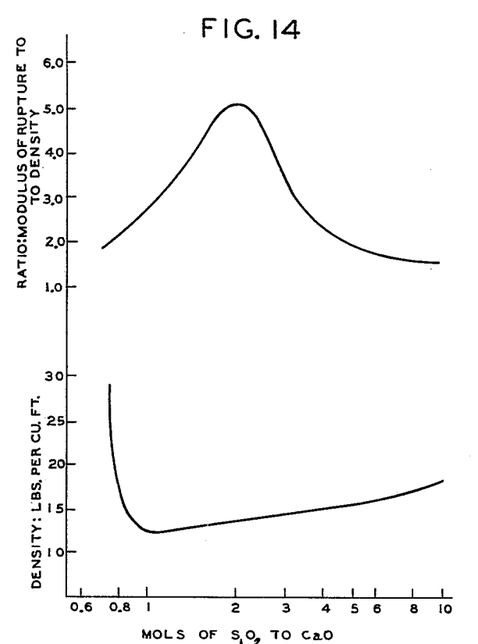

Figs. 13 and 14 exemplify the changes in physical properties when the composition of the silica and lime is varied.

Figure 15:
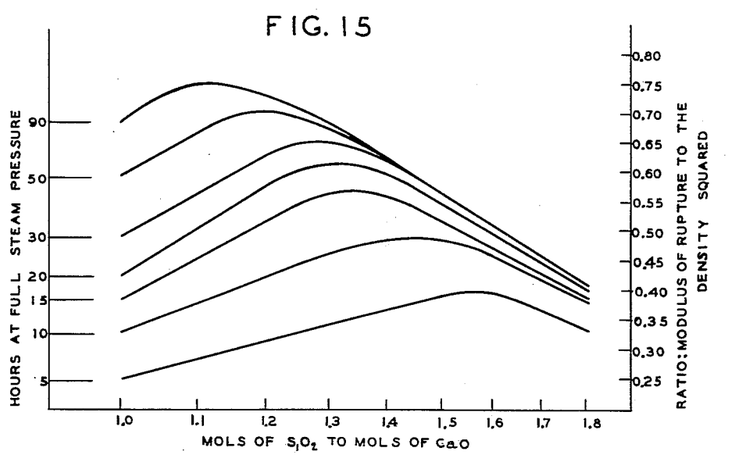
Figure 16:
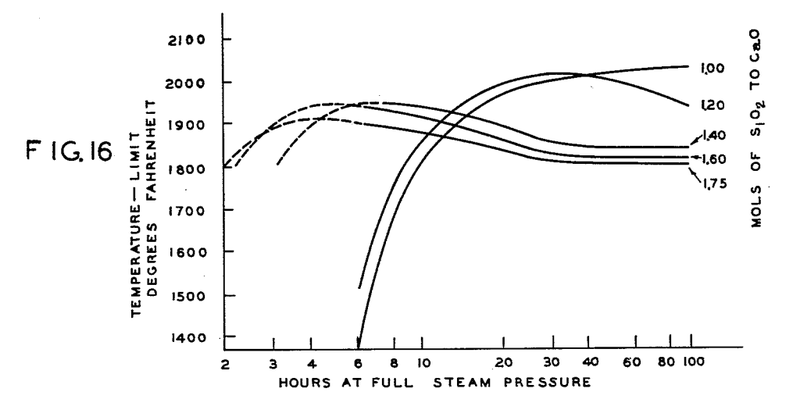

Figs. 15 and 16 show the change in some of the physical properties when the composition of the silica and the lime is varied. These curves differ from those of Figs. 13 and 14 in that the range of silica to lime ratio is much more limited in Figs. 15 and 16, also the degree of reactivity of the lime was greater than in Figs. 13 and 14, and the transverse strength has been expressed as a ratio of the modulus of rupture to the square of the density. This was done to eliminate the density variable, and the expression is permissible since the modulus of rupture to density ratio shown in Fig. 11 varies as a straight line function of the density and will intersect zero transverse strength at zero density. A third variable, autoclaving time, is introduced in the curves of Figs. 15 and 16.

Figure 17:
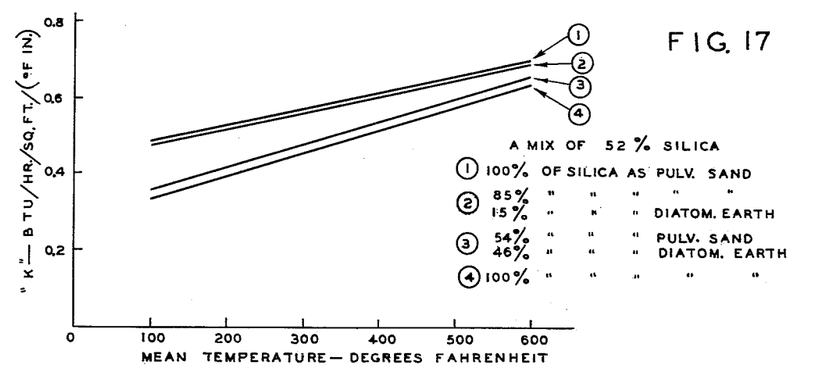

Fig. 17 exemplifies the effect of the type of silica used as a raw material on the thermal conductivity of the product.

Figure 18:
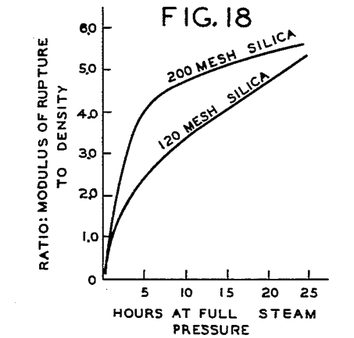

Fig. 18 illustrates the effect of fineness of the silica on the strength of the product at various autoclaving times.

Figure 19:
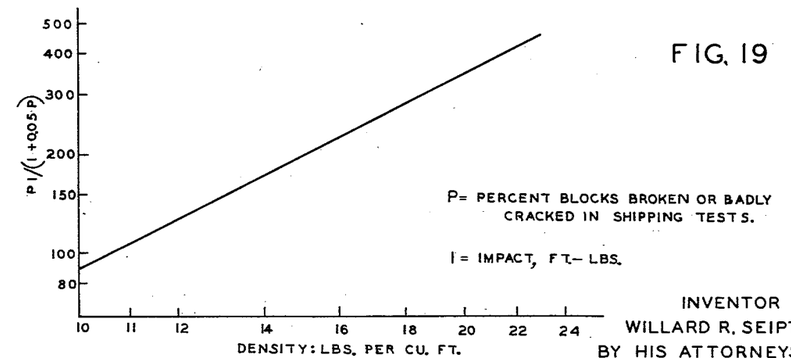

Fig. 19 repersents the reenforcing effect of the fibres expressed as the function of density and impact strength as related to shippability.

Figure 20:
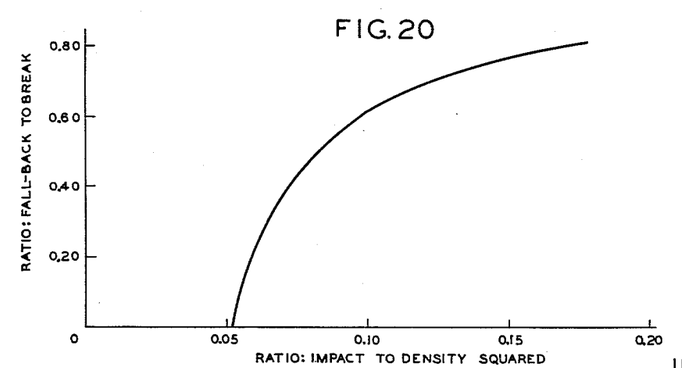

Fig. 20 shows another method for evaluating the reenforcing effect of the fibres.

Figure 21:
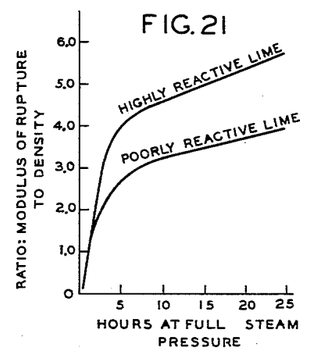

Fig. 21 shows the result of the degree of lime reactivity on the strength of the product when subjected to different autoclaving times.

Figure 22:
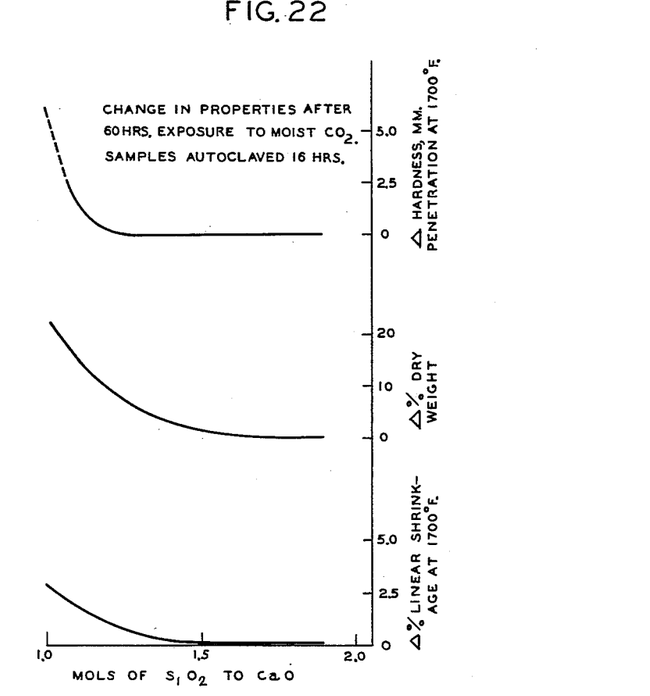

Fig. 22 represents the change in physical properties of the dried product after exposing it to moist carbon dioxide gas as compared to the properties before exposure. An excess of lime in the product impairs some of the physical properties. This condition is shown to an exaggerated extent by the rather severe test exemplified in Fig. 22. The calcium silicate product used in these tests was autoclaved about 16 hours. By referring to the curves in Fig. 15 it will be noted that in 16 hours the maximum strength occurs using a mol ratio of silica to lime of about 1.35. In Fig. 22, the properties are noted to change appreciably below a ratio of 1.35. This indicates that the products made with a silica-lime ratio less than those ratios corresponding to the maximum strength at one particular autoclaving time, may contain free lime. In order to insure against the presence of free lime, the original hydrated lime should be in a fine state of sub-division; that is, the calcium hydroxide particles should have nearly colloidal dimensions so as to be highly reactive besides contributing to the suspending action of the asbestos fibres. Probably its activity depends on the many surfaces available to react and on the colloidal nature of the lime forming a disperse suspension so that all surfaces are more readily available for reaction.

The effect of autoclaving time on the strength of the product using two limes of different degrees of activity is shown in Fig. 21. The strength is a result of the degree of completion of the reaction. The poorly reactive lime produces weaker material; the result of a less complete reaction. Some of the lowered strength of the less reactive lime may also have been a result of a greater amount of impurities particularly calcium carbonate since this lime was a dry hydrate.

In the practice of this invention, it is believed that the use of hydrated quick lime gives the best results because it introduces a minimum of non-binding or otherwise detrimental impurities. It has been found that a very highly colloidal and highly reactive calcium hydroxide can be prepared most readily by the use of so-called pebble lime. The hydration is accomplished by using an excess of water. About twenty times the theoretical weight of water to form calcium hydroxide is used, or approximately six times the weight of the pebble lime. The best colloidal dispersion of the calcium hydroxide is formed by a rapid means of hydration. The speed of the hydration can be increased by a more vigorous agitation and/or an increase in hydration temperature. The choice of the proper quick lime also has a bearing on its speed of hydration. In the parlance of the lime industry, an "immediate-slaking" lime is preferred. The poorly reactive lime shown in Fig. 21 was hydrated with only a slight excess of water so that immediately following the completion of the hydration, it was essentially dry.

Explaining the function of the fibre in greater detail, the maximum reenforcing power of the fibres occur when they are oriented in the preferred direction and when the length to diameter ratio does not exceed a critcal value, as set forth above. The critical length to diameter ratio is difficult to define precisely but can be interpreted by its effect in the product. When a block is subjected to a flexural or bending stress, one surface of the block acquires a tensile stress and the other surface a compressive stress. Since the product has a compressive strength considerably in excess of its tensile strength, the applied bending stress will cause the piece to fail in tension. The fibres act as reenforcing agents to increase the tensile strength of the block and thereby increase its resistance to flexural stresses. The maximum reenforcement is attained when the fibre is opened up to the extent that the majority of the fibres over the broken cross-section will be pulled out of either one or both surfaces of the broken piece rather than be pulled apart even with the fractured surface of the piece. If this ratio is exceeded the bond to the fibre surfaces is great enough to exert a force on the fibres of sufficient magnitude to pull them apart. It has been found that harsh fibres are advantageous in this respect. A harsh fibre is one that has a considerable degree of resiliency, such that a deflected fibre will return to its originally straight form upon removal of the restraining force. Examples of such fibres are amosites of the amphibole group, the harsh Arizona chrysotiles, the harsh African chrysotiles and the like. Distinguished from them are the soft fibres that can be twisted or bent in any direction and remain essentially in that position when relieved of the deflecting force such as the Canadian chrysotiles.

Due to the resiliency of the harsh fibres, they can be opened to a sufficient degree, without exceeding their crictical length to diameter ratio, and still yield a good bulk value and thereby support the solids in the suspension. In contradistinction, soft asbestos fibres must be pulped a considerable amount to give the necessary bulking value so that the chance of exceeding their critical ratio is increased, as is noted by the broken fibres over a ruptured cross-section of the material.

The impact strength has been cited previously as a measure of the reenforcing value of the fibres in the product. Fig. 19 of the drawings, illustrates the effect that the impact strength has in preventing damage by shock in shipment. The data for this curve was obtained from a simulated shipping test of the blocks of insulation in cartons. Of course, the per cent of damaged blocks represented is only relative and will vary with the degree of the treatment, nevertheless it does show the trend that can be expected. The factor (P) represents the per cent of the blocks that were damaged. If the density is considered as remaining constant, then the amount of damage varies inversely as the impact strength, (I) in the drawings. It will also be noted from the drawing that to maintain a constant per cent damage under a given treatment ("P" is constant), the impact must vary as the square of the density. Hence to compare products of different densities, the density variable can be eliminated and comparisons made by the expression, the ratio of impact strength to that of the density squared. Similarly, as has been shown previously, to eliminate the variability of transverse strength induced by the density, the strength is expressed as the ratio of the modulus of rupture to the square of the density.

A ratio of impact strength (in foot-pounds) to density (in pounds per cubic foot) squared of 0.10 will result, from Fig. 19, in a calculated breakage of 16 per cent, while 100 per cent breakage corresponds to a ratio of about 0.05. Hence a material having poor reenforcement will have ratios between 0.05 and 0.10. A better means of distinguishing the reenforcing value of weaker materials is what I have called the ratio of (fall-back to break). The break is obtained as the load to cause rupture by the standard flexure test. As soon as the specimen breaks, the deflection or movement of the load applying bearing at the mid-span is discontinued and the residual load the specimen supports is determined. This value is called the fall-back load. The ratio of the fall-back load to the breaking load is shown in Fig. 20, as a function of the ratio of impact to density-squared. It will be noted that in the region of impact ratios between 0.05 and 0.10, the ratio of fall-back to break is a more sensitive expression.

The following illustration serves to show the reenforcing powers of various fibres:

| Type of Fibre | Grade of Fibre | Fibre in Product | $\frac{I}{D^2}$ | $\frac{F-B}{B}$ |
|---|---|---|---|---|
| | | Percent | | |
| 1. Soft Canadian Chrysotile | 6D | 12 | 0.065 | 0.05 |
| 2. Soft Canadian Chrysotile | 3T | 12 | 0.070 | 0.37 |
| 3. Soft Canadian Chrysotile | 6D / 3T | 6 / 10 | 0.067 | 0.43 |
| 4. Soft Canadian Chrysotile | 6D / 3T | 8 / 12 | 0.070 | 0.54 |

The above table shows that the reenforcing value of soft fibres is rather low and cannot be distinguished among themselves by the ratio of the impact to density squared. However, the fall-back to break does show a pronounced difference. Fibre grades are classed according to the Canadian Box Test such that the average fibre lengths of a particular grade are classified by numbers, the lower number representing the longer grade. Each class is sub-divided and each sub-division indicated by a letter following the class number. The data above shows that longer fibres and a higher percentage of fibre content has a beneficial effect upon reenforcing the product, but as pointed out, only to a rather small degree.

The value of harsh fibres is best shown by the following examples:

| Type of Fibre | Grade of Fibre | Fibre in Product | $\frac{I}{D^2}$ | $\frac{F-B}{B}$ |
|---|---|---|---|---|
| | | Percent | | |
| 1. Soft Canadian Chrysotile | 6D / 3T | 8 / 12 | 0.070 | 0.54 |
| 2. Soft Chrysotile Harsh Amosite | 6D / M-1 | 8 / 12 | 0.108 | 0.67 |
| 3. Harsh Amosite | M-1 | 15 | 0.102 | 0.75 |
| 4. Harsh Amosite | M-1 | 20 | 0.144 | 0.80 |
| 5. Harsh Amosite* | M-1 | 20 | 0.158 | 0.75 |
| 6. Harsh African Chrysotile* | C&G/BB | 20 | 0.173 | 0.68 |
| 7. Commercial 85% Magnesia | | | 0.126 | 0.76 |

*A slightly better fibre orientation due to method of filling.

The reenforcing power of the fibre is best illustrated in the above table by the ratio of impact to density squared, since above a ratio of 0.10, this expression is the more sensitive one as will be noted on the curve of Fig. 20. Replacing part of the soft fibres by the harsh fibres has a decided beneficial effect. However, the reenforcement is still not quite enough as judged by a comparison to the commercially satisfactory product, 85 per cent magnesia. Complete replacement produces a very satisfactory product that has sufficient reenforcement.

Another means for evaluating the advantage of the harsh fibres can be observed by subjecting full size, commercial pieces to a hot surface and, after cooling, examining the blocks for complete breaks or serious cracks. Pieces 36 x 6 x 1½ inches were placed on a hot surface, in a stack 4 such pieces deep, at 1530 degrees Fahrenheit for 24 hours. The following table shows the average results of a number of such tests:

| Type of Fibre | Grade of Fibre | Fibre in Product | Average number of breaks and serious cracks per piece |
|---|---|---|---|
| | | Percent | |
| 1. Soft Canadian Chrysotile | 6D / 3T | 8 / 12 | 0.75 |
| 2. Harsh Amosite | M-1 | 15 | 0.25 |
| 3. Harsh Amosite | M-1 | 20 | 0.25 |
| 4. Harsh African Chrysotile | C&G/BB | 20 | 0.00 |

A much better reenforcing action of the harsh fibres is evident by examining the results of the hot plate applications given in the above table.

As has been explained previously, several factors are responsible for the increased reenforcement of the harsh fibres; the resiliency and the better length to diameter ratio. However, this advantage is not fully realized unless the fibres are oriented in the preferred direction as has already been set forth. It is believed that the resiliency of the harsh fibres is responsible for the greater ease of proper orientation.

As a mold is filled the slurry tends to roll along, producing minor disturbances in the flow pattern, probably so-called eddy currents. Soft fibres tend to roll up with the slurry into a ball more-or-less, or to line up parallel to the mold width and in either case to reduce its maximum reenforcing power. Harsh fibres, due to their resiliency, are not influenced to as great an extent by the small eddying movements of the slurry, particularly if the slurry moves forward from the filling nozzle at a relatively high velocity and strikes the bottom of the mold at an angle and near one end. This description is merely by way of explanation for whatever phenomena is responsible and is in no way intended to limit the scope of the invention.

Calcium hydroxide reacts with silica to produce a hydrated calcium silicate. The hydrated calcium silicate formed is in a gelatinous condition. When a particle of siliceous material reacts, a shell is believed to form around the particle preventing, at least for a time, more lime from reacting with the particle to convert it completely to the calcium compound. Thus, if large particles are present they may have unreacted cores in the finished product. These cores add weight to the final product, but are not microporous and do not contribute to the cementing bond. The result of this condition on the strength of one mix using pulverized silica sand and at different autoclaving times is shown in Fig. 18. The strength of the material containing the coarser sand approaches that of the finer sand on continued autoclaving. This shows the slower reactivity of the coarser sand. Therefore, it is preferable that the silica should be pulverized to as fine a degree as is commensurate with the economy of the process. The structure of the silica molecule is also a factor that controls its reactivity. For example, a hydrated silica such as an opaline silica, is more reactive than a pure quartz silica. Diatomaceous earth is an opaline silica and will react more rapidly than finely pulverized quartz silica. This is due partly to the high surface area of the diatoms. But a calcined diatomaceous earth which has lost its water of hydration, reacts more slowly than uncalcined earth. The hydrated character has some bearing on the speed of the reaction.

I have found another advantageous use for the naturally occurring diatomaceous earth. By its use a more efficient thermal insulation is possible. This is shown in Fig. 17 where the thermal conductivity is expressed as a function of the mean temperature of the insulation. The product made with all the silica in the form of diatomaceous earth (curve No. 4) is 20 per cent more efficient than that made with all pulverized sand (curve No. 1). As much as 54 per cent of the silica in the form of pulverized sand and the remaining 46 per cent as diatomaceous earth (curve No. 3) may be used without appreciably lowering the efficiency from that using all diatomaceous earth. The phenomena responsible for the lowered conductivity of the diatomaceous earth mixes are not understood. It is possible that due to the extremely fine condition of the individual particles, they can spread out between the water filled voids to a greater extent so that when the calcium silicate reaction occurs the gelatinous hydrated calcium silicate formed has a finer microporous structure.

The diatomaceous earth is also desirable for its high bulk value. However, several disadvantages present themselves by its use that tend to limit the amount that is used. First, the diatomaceous earth is a costly raw material as compared to finely pulverized sand. Second, as will be explained later, the introduction of undesirable impurities in the diatomaceous earth tends to lower the useful temperature limit of the product. Hence, in view of the above properties, it is desirable to limit the diatomaceous earth so that its silica content is between 40 and 66 per cent of the total silica in the mix available for reaction. In a mixture of diatomaceous earth and pulverized silica, the earth would be about 45 to 80 per cent of the mixture.

According to the literature, formed calcium silicate gel tends to fill all available space. Therefore, finer materials, tending to react more completely, fill the voids between the fibres more completely. When this product dries, its structure will be more highly microporous. Also this structure should have a better crushing strength and will add to the thermal insulating value of the finished article.

Another advantage will accrue by the use of very fine particles of raw materials. A light weight body requires a high percentage of void space. In order to attain the necessary voids, the unreacted materials must be held in a dispersed suspension until the cementing bond has formed. The prepared fibre remains fairly well suspended in the necessary dilution by itself. However, when the lime and the silica are mixed with the fibres, they tend to weight down the fibres, packing the mass to a greater density. This inclination to pack always results in a greater tendency to pack toward the bottom of the mass, imparting a gain in density with increased depth. It is desirable to alleviate this condition. It has been found that this can be achieved by the use of finer materials. Essentially all particles have some electrical charges on their surface. The greater the surface per unit weight, the more will be the electrical charge for a unit weight of material. The electrical charges on each particle tend to repel other particles of like charge. It is felt that this repulsion assists in supporting the particles in suspension.

It is preferable that the pulverized sand be fine enough so that at least 95 per cent will pass through a standard No. 200 screen, and at least 85 per cent will pass through a No. 325 screen. The diatomaceous earth should be fine enough so that the residue on a standard No. 200 screen does not exceed 5 per cent. The hydrated lime should have a degree of fineness such that a slurry of one part of hydrated lime in four parts of water by weight will settle less than one per cent of the slurry height in a column 3.6 centimeters in diameter and 25 centimeters high.

Not only is the time of setting dependent upon the reactivities of the lime and silica, but on the ratio of the mols of silica to the mols of lime. Figs. 13 and 14 show the relation between some of the physical properties of the set product for a wide range of ratios. This material was prepared from a poorly reactive lime and autoclaved for about 16 hours. The three curves, abrasion loss, compression and modulus of rupture are indications of the strength. All three curves show a maximum strength at the same silica-lime ratio. This means the most complete reaction for the particular conditions of this test occur with the silica-lime ratio having the greatest strength.

The curve of Fig. 14 shows the variation in density. Above a silica-lime ratio of one, the density increases slightly, probably due to the increased amount of excess silica. At high silica-ratios, the density increases more rapidly due to an increased tendency for the mix to settle. Below a ratio of one, the density increased tremendously. This may be due in part to a tendency toward settling, but the major source of this increase is the result of drying shrinkage caused by the weak structure as a result of an excess of free lime.

The curves of Fig. 15 show the modulus of rupture for a limited range of silica-lime ratios which include the maximums explained above. Various autoclaving times were used in these tests. A highly reactive lime and a finely pulverized silica sand (200 mesh) was used. These curves are also applicable to silica from diatomaceous earth sources, as limited tests have shown. By comparing the maximum strength at 16 hours with that prepared from a poorly reactive lime (see Fig. 14), it will be seen that the maximum strength occurs at a lower silica-lime ratio for the highly reactive lime and the strength in the latter case is higher. It will be noted that the transverse strength in Fig. 15 is expressed as the ratio of the modulus-of-rupture to the square of the density. This was done to eliminate the variation introduced by differences in density and has been shown previously to be permissible. From Fig. 15, as the autoclaving time is increased, the maximum strengths increase in value and they occur at lower ratios. The silica-lime ratio, having the greatest strength for a particular autoclaving time, seems to approach a value of one as the autoclaving time is increased without limit.

The effect of an excess of free lime on the temperature limit of the product made using pulverized silica sand was determined by shrinkage measurements on specimens subjected to a soaking heat and is shown in Fig. 16. The alumina content of the products of this test was low and hence these curves do not strictly apply to those products made with diatomaceous earth as a raw material because of the introduction of a higher alumina content. The effect of alumina in reducing the temperature limit of the product will be explained later. As shown in Fig. 16, an excess of free lime reduces the temperature limit considerably. However, an excess of free silica reduces it only slightly. It will be noted, also, that the lower the silica-lime ratio (above a value of 1), the longer the autoclaving time to produce an equivalent temperature limit.

Based on the desired properties of the product and limited by economic considerations, the time of autoclaving may vary between 2 and 20 hours at full pressure. The slurry of raw materials is caused to set by autoclaving. As explained previously, the lime reacts with the silica in the presence of moisture to form a hydrated calcium silicate. This reaction is accelerated by heat (autoclaving). The higher the temperature, the faster the reaction proceeds. Above a certain temperature, the reaction products differ; more complex hydrated calcium silicates are formed. These are undesirable because they do not form as good a cementing bond as the simpler compounds formed at the somewhat lower temperatures. The most desirable product occurs at temperatures between about 328 and 363 degrees Fahrenheit, corresponding to 100 and 160 pounds gauge pressure of saturated steam.

The general theory of the mechanism of setting is the formation of a rigid, irreversible gel. Solutions of lime and silica react to form a solution of calcium silicate. Eventually a supersaturated solution forms. The precipitation of the hydrated calcium silicate from the supersaturated solution seems to form a gel. This gel is rigid and irreversible and acts as a glue to hold the mass together.

The following example will serve to illustrate a specific method by which the product may be prepared; a quantity of amosite fibres, as they were received from the mines, were opened in the dry condition as described previously. This increased the bulk value of the fibre about six to eight times that in the bag. By a visual examination, this preparation still retained a considerable quantity of fibre lengths about equal to that of the original fibre. They had considerable resiliency when pressed in a tight ball, and although large bundles of fibre had been opened yet the opening was not excessive since a number of fine splits were still present.

Twenty-one and one-quarter pounds of a high calcium, pebble quick-lime were hydrated with three and one-half pounds of pulverized reclaim in fifteen gallons of water. The hydration was carried out under vigorous agitation in a three foot diameter commercial Hydrapulper having an impellor velocity of about 750 revolutions per minute for a period of ten minutes. To the hydrated slurry was added an additional forty-two gallons of water, fifteen pounds of the previously prepared amosite fibre, nine and three-quarter pounds of 200 mesh pulverized silica sand and twenty-one and one-quarter pounds of a natural diatomaceous earth. This mixture was thoroughly dispersed with high speed agitation using the Hydrapulper for a period of five minutes. The slurry was then dropped to a cone bottom storage tank from which the lubricated molds were filled. The slurry issued from a pipe at the bottom of the storage tank and hit the bottom of the mold at a forty-five degree angle at the near end. The mold was vibrated to release any entrapped air pockets. The mold, with its substantially air free contents, was placed in an autoclave. Steam was applied and brought to a gauge pressure of 125 pounds in a matter of about 10 minutes. Full pressure of 125 pounds was held in the autoclave for 12 hours, whereupon it was released at a uniform rate of pressure decrease and brought to atmospheric pressure in 3½ hours. The set material was removed from the mold, trimmed and split to smaller sizes. These sized pieces were placed in an oven until thoroughly dried. The average properties obtained are shown in the following chart, in comparison with two of the better commercial insulations of the same general type:

| | Commercial Insulations of Same General Type | | Calcium Silicate |
|---|---|---|---|
| | No. 1 | No. 2 | |
| Density, pounds per cubic foot | 12.4 | 22.5 | 10.0 |
| Hardness, millimeters' penetration; of ⅛" ball point under 1 kilogram load | 0.80 | 0.75 | 0.95 |
| Modulus of Rupture to Density, Ratio | 4.5 | 3.5 | 5.0 |
| Impact to Density Squared, Ratio | 0.12 | 0.12 | 0.15 |
| Fall-back to Break, Ratio | 0.78 | 0.65 | 0.75 |
| Compressive strength, pounds per square inch, at 5% reduction in thickness | 90.0 | 95.0 | 72.0 |
| Abrasion Resistance: | | | |
| Percent loss in 10 minutes | 30.0 | 35.0 | 16.0 |
| Percent loss in 20 minutes | 50.0 | 60.0 | 32.0 |
| Thermal conductivity, B. t. u. per hour per square foot per degrees Fahrenheit per inch at a mean temperature of: | | | |
| 300 degrees Fahrenheit | 0.44 | 0.65 | 0.47 |
| 800 degrees Fahrenheit | | 0.80 | 0.75 |
| Change in properties after 6 hours' soaking heat at degrees Fahrenheit | 550 | 1,500 | 1,900 | 1,500 |
| Percent linear shrinkage | 0.2 | 1.0 | 4.2 | 1.9 |
| Percent loss in weight | 14 | 9 | 9 | 9.7 |
| Hardness | 1.0 | 0.90 | 0.55 | 1.00 |
| Temperature limit, degrees Fahrenheit | 600 | 1,900 | | 1,500 |

In almost all insulation industries, a certain amount of trimmings and rejected materials are obtained. This material is largely waste. It is usually reincorporated as much as possible to offset the loss. In some insulations, particularly 85 per cent magnesia and the clay-bonded, diatomaceous earth products, the waste material tends to increase the density and drying shrinkage without an equal gain in strength. On the other hand, 1 to 10 per cent of the finely pulverized, previously formed and dried calcium silicate insulation was found to impart the desirable property of a rather thin and yet stable suspension. A thin suspension is desirable because it is more easily mixed and handled, and any entrapped air may be more readily dislodged.

Figure 24:
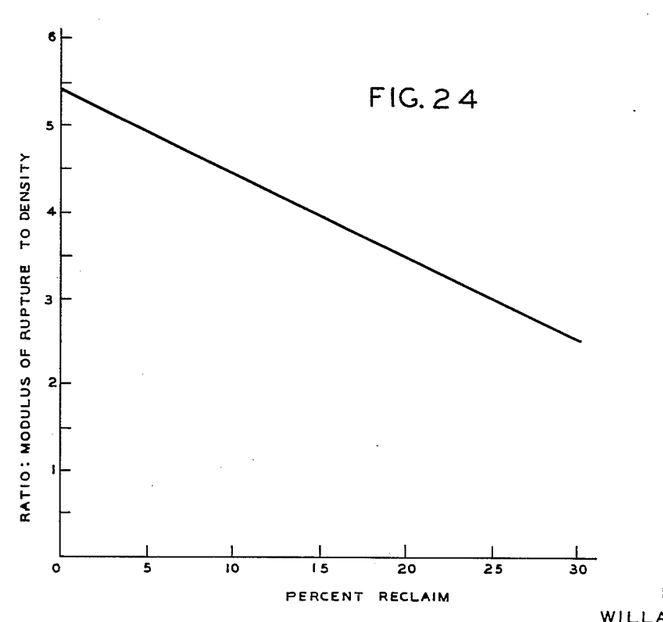

Fig. 24 shows the effect on a calcium silicate product, prepared in the hereindescribed manner, of different percentages of added reclaim. With no reclaim the batches were rather thin, and settling of the solids in the mold was appreciable. The tendency to settle becomes progressively less with increasing percentages of added reclaim, but since the modulus of rupture-density ratio is also progressively reduced the practical limit appears to be in the neighborhood of 25 per cent since beyond that point the aforesaid modulus of rupture-density ratio tends to fall below the established minimum for products of this character. In general, it is preferred to use the reclaim in amounts in the neighborhood of 5 per cent as indicated for example, in the following formula:

21.2 per cent asbestos fibre
30.0 per cent CaO
30.0 per cent natural powdered diatomaceous earth
13.8 per cent pulverized silica
5.0 per cent reclaim.

It is well known that the fusion point of any pure substance is nearly always reduced somewhat by the addition of small amounts of impurities. For an insulation, the reduction of the fusion point also means a lowering of the useful temperature limit of the material. It has been found that such is the case with calcium silicate insulation. Small percentages of iron impurities reduce the temperature limit somewhat, but small percentages of alumina were found to be particularly detrimental in this respect.

If small pieces of insulation, say 5x2x1 inches in size, are subjected to soaking heat tests for a period of at least 6 hours, there will be a soaking temperature above which the shrinkage becomes excessive and numerous cracks develop. It has been observed that this temperature corresponds to an average linear shrinkage of about 4.5 per cent. For the sake of brevity, this will be called the "temperature limit" of the material in the following discussion. It is not, however, to be confused with the true temperature limit, mentioned previously, of the full size insulation applied to a hot surface. This latter limit is always lower than the former. The difference between them is a function of the effective fibre reenforcement within the material.

In order to clarify the role of these impurities in calcium silicate insulations, some test results are cited below. A chart, Fig. 23, reveals graphically the effect of the alumina content on the reduction of the temperature limit. All the alumina contents cited below and in the drawings are "free" alumina contents (that content available for reaction with the lime) in addition to that of the basic mix used for this series of tests. The basic mix is composed of a molar ratio of silica to lime of 1.4 using 12 per cent chrysotile fibre and pulverized silica sand, and which consists of an approximate initial "free" alumina content of 0.7 per cent.

Five per cent iron oxide, added as very finely powdered red ferric oxide reduced the temperature limit from 1900 to 1750 degrees Fahrenheit. However, five per cent alumina, reference 1 in Fig. 23, added as very finely powdered bauxite, reduced the temperature limit from 1900 to 1400 degrees Fahrenheit. Ten per cent alumina, reference 1 in Fig. 23, was no more effective than five per cent. A mixture of five per cent alumina and five per cent ferric oxide, reference 4 in Fig. 23, had a limit around 1350 degrees Fahrenheit, while one having 2½ per cent alumina and 2½ per cent ferric oxide, reference 4 in Fig. 23, had about 1450 degrees Fahrenheit as a limit.

Figure 23:
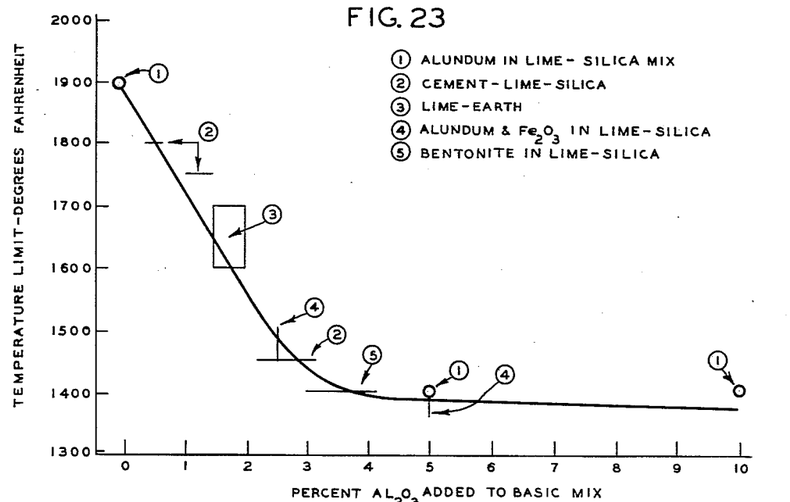

A calcium silicate prepared using portland cement as the lime-producing ingredient, introduces alumina, reference 2 in Fig. 23. The composition of the lime and silica when held constant in the finished product, but made with varying amounts of lime, pulverized silica sand and Portland cement reduced the temperature limit from 1900 degrees Fahrenheit to about the following values:

| Percent Portland Cement in the Raw Materials | Approximate percent Al₂O₃ introduced in Product | Temperature limit, Degrees Fahrenheit |
| --- | --- | --- |
| 12 | 0.7 | 1,800 |
| 24 | 1.4 | 1,750 |
| 50 | 3.0 | 1,450 |

When 15 per cent bentonite clay, reference 5 in Fig. 23, was added with the raw materials so that the finished chemical analysis was practically unchanged except for an increase of 3 to 4 per cent in the alumina content, the temperature limit was reduced from 1900 to about 1400 degrees Fahrenheit.

Diatomaceous earth, reference 3 in Fig. 23, as a source of silica, whose content in the insulation was around 50 per cent, introduced 1½ to 2 per cent alumina above that which was introduced by using fairly pure pulverized silica sand. The temperature limit was reduced from 1900 to a value between 1600 and 1700 degrees Fahrenheit.

As stated above, the material prepared for this series of tests had an available alumina content in the finished product of about 0.7 per cent. In order to have a product with a temperature resistance above 1500 degrees Fahrenheit, an extra available alumina content of 2.3 per cent, or a total available alumina content of 3.0 per cent of the dry finished product is the maximum permissible. By referring to Fig. 23 it will be apparent that the extra available alumina content must be limited to 2.3 per cent to obtain a temperature limit above 1500 degrees Fahrenheit.

The problem is to maintain the total available alumina content below 3.0 per cent. This can be done in several ways. One method is to use raw materials having a very low alumina content; either low in alumina originally such as high purity pulverized silica sand or hydraulic cements low in alumina; or in which the alumina content is reduced, such as by washing clay materials from diatomaceous earth. A second way is to use only limited quantities of materials higher in alumina such as clays, portland cements, diatomaceous earths, etc., so as to keep the available alumina content of the mix below 3.0 per cent on the basis of the finished product.

If it is desired to maintain the temperature limit in excess of 1700 degrees Fahrenheit, the maximum extra, available alumina content allowable would be 1.2 per cent, or a total, maximum, available content of 1.9 per cent. This is evident from Fig. 23. Likewise, a total, maximum, available alumina content of 1.3 per cent is the limit allowable to maintain a temperature limit above 1800 degrees Fahrenheit.

I claim:

1. In the manufacture of elongated shapes of thermal insulation from a slurry of calcium hydroxide, siliceous material and asbestos fibres, the method which comprises feeding the slurry through a flow line to effect orientation of the asbestos fibres lengthwise of the path of flow, discharging the fibre-oriented slurry from said line through a discharge orifice having a flow axis extended obliquely downwardly with respect to the horizontal, sequentially charging from said flow line a series of horizontally elongated upwardly-open pan-cast molds each having a vertical cross sectional area greater than that of said discharge orifice by successively positioning each mold with one end thereof adjacent said discharge orifice and with the mold extended therefrom beyond said orifice in the direction of flow from said orifice, and delivering successive portions of the slurry from the flow line into the molds, each mold being retained in the position referred to during the filling thereof, thereby providing for charging of the molds with charges of the slurry retaining fibre orientation imparted to the slurry in the flow line and having said fibre orientation disposed lengthwise of the molds, and curing the fibre-oriented charges in the molds.

2. A thermal insulation comprising a substantially homogeneous micro-porous body element essentially consisting of the reaction products of calcium hydroxide and siliceous material together with reinforcing asbestos fibres, said body having a density of from 7 to 20 pounds per cubic foot, and the asbestos fibre content of said body being from 8% to 40% by weight of the dry solids content thereof, and said body containing not in excess of 3% reactable alumina and having a temperature resistance such that when a plurality of pieces thereof 1½" thick and 6" wide are stacked upon a surface heated to approximately 1550° F., no appreciable cracking of the pieces occurs.

References Cited in the file of this patent

UNITED STATES PATENTS

| | | |
| --- | --- | --- |
| 1,520,893 | Teitsworth | Dec. 30, 1924 |
| 2,326,516 | Brown | Aug. 10, 1943 |
| 2,400,884 | Lloyd | May 28, 1946 |
| 2,421,721 | Smith | June 3, 1947 |
| 2,432,981 | Abrahams | Dec. 23, 1947 |
| 2,442,519 | Schuetz | June 1, 1948 |
| 2,469,379 | Fraser | May 10, 1949 |